Nov. 26, 1968 R. A. BROWN 3,413,547
FAIL SAFE DEVICE FOR DEMAND METER TIMING MOTORS
Filed Oct. 24, 1965
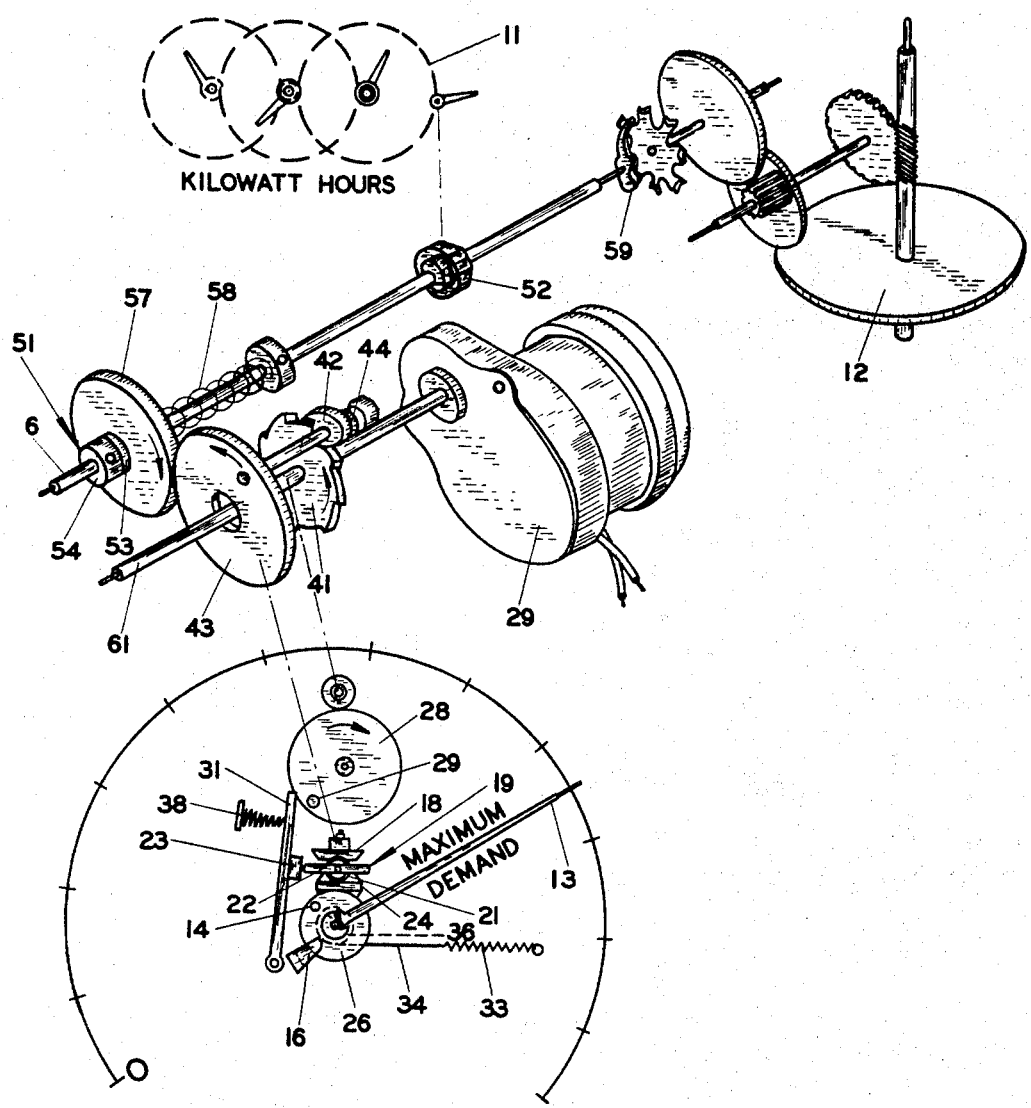
INVENTOR:
ROBERT A. BROWN
BY
ATTYS 3,413,547
FAIL SAFE DEVICE FOR DEMAND
METER TIMING MOTORS
Robert A. Brown, Lafayette, Ind., assignor to Duncan Electric Company, Inc., a corporation of Indiana
Filed Oct. 24, 1965, Ser. No. 505,074
9 Claims. (Cl. 324—103)

ABSTRACT OF THE DISCLOSURE

To prevent demand meter indications that are falsely high because of stoppage of a timing motor while the meter continued to move the demand train, blocking means are provided for preventing movement of the demand train except when the timing motor is running. The blocking means may be an overrunning device such as a ratchet and pawl, the clock driving one of these members faster than the maximum speed of drive of the other by the meter. Alternatives are disclosed.

---

The invention of which this disclosure is offered for public disemination in the event that adequate patent protection can be given, relates to the elimination of a troublesome source of occasional errors in demand meters.

In order to bill industrial users of electricity their fair share of the costs of supplying electric service to them, their meters are usually "demand meters." In addition to having the usual kilowatt hour dials, such as every home owner is familiar with on the meter by which he is billed, demand meters provide another reading which indicates the maximum demand on the power facilities during the month. It is appropriate to bill for electric service not only for the total energy supplied but for the amount of generating and distribution equipment required by the users' maximum needs or "demand." Most demand meters include a timing motor. It is most commonly used for periodically (say at the end of every fifteen minute "intervals") resetting to "zero" a pusher element which is then driven upscale by the meter disk. If before the pusher is again reset to "zero" it reaches a new high for the month or billing period, it will push upscale a maximum demand pointer or dial, leaving it there when the pusher is again reset to "zero."

If the timing motor fails while the electric service continues, the pusher will not be reset to "zero" at the end of the allotted "interval" but will continue to be driven upscale. If, during this extra time, it moves the maximum demand pointer, error will result. The meter will show a higher demand than it should. If the timing motor failure is permanent, the demand reading will be so high that the error will be apparent. In such cases, a pointer type of maximum demand indicator will usually be at the high end of its scale. The reading will be thrown out, the meter repaired, and the electricity supplier may lose considerable revenue. Many one-month demand charges amount to hundreds of dollars, some to thousands. The electricity suppliers are even more concerned, however, with situations in which the timing motor may fail only temporarily, as due to an intermittent circuit failure. In that event, the error may be too small to be detected, and the customer will be overcharged.

According to the present invention, all such errors due to failure of the timing motor of demand meters are prevented. In the preferred forms, this is accomplished by providing a blocking device which blocks the upscale movement of the pusher unless the timing motor is running. This blocking device may comprise, for example, a ratchet wheel which, if stationary, will be engaged by a pawl on the drive to the pusher element to stop movement of that drive, the ratchet wheel normally being driven by the timing motor at a speed fast enough to permit the fastest movement of the pawl which is to be tolerated for the class of meter in question. When the timing motor is running, the ratchet wheel rotates fast enough to have no blocking action. If the timing motor stops, the ratchet wheel stops and its blocking action begins.

Instead of blocking the movement of the pusher, it would be possible to let its movement continue but to cause to move with it an indicator which would indicate the amount of the movement of the pusher which occurred during timing-motor failure, so that this amount could be subtracted from the maximum demand reading. This is considered a less desirable form of the invention, because although it would safely prevent over-charging of customers, the amount subtracted would almost always be excessive inasmuch as it would include pusher movements which did not raise the maximum demand indication.

Instead of blocking movement of the pusher drive in a positive blocking sense, the blocking device could render the drive inoperative in some other way.

Inasmuch as the drives for the pusher element and the kilowatt hour register dials are generally derived from the same source, positive blockage of the pusher element drive would tend to stop also the kilowatt hour drive. This is avoided by placing a friction clutch in the drive for the pusher element, ahead of the stoppage point, so that the watthour register mechanism may continue to move.

Designation of figure

The drawing is a combined schematic and exploded or stretched out perspective view of the form of invention chosen for illustration.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Background description

In maximum demand meters, there is usually the conventional kilowatt hour register 11 which is advanced by meter disk 12. In addition, there is a maximum demand indicator or element illustrated as pointer 13 which at the end of the billing period will be read by the meter reader as an indication of the maximum power demand required by the installation during the billing period, and swung back to zero to start a new period. It is, of course, appropriate to bill, not only for the power used, but for the amount of generating and distribution facilities which an installation requires to meet its maximum demand.

The maximum demand element 13 is moved to its point of highest demand during the period by means of a transient demand element represented by pusher pin 14. Such a pusher or other transient element is sometimes called a transient demand indicator even though it is not read. In the case of a block interval demand meter, such as is illustrated in the drawings, the pin 14 is returned at the end of each interval (commonly 15 minutes) to a zero position represented by stop 16. During the interval, it is advanced, in accordance with energy consumption, by the rotating disk 12. If it reaches a point higher than it had previously reached during the billing period, the pin 14 will strike maximum demand indicator 13 and move it to a new high position. The maximum demand indicator 13 remains at its advanced position until the end of the billing period when the meter reader, after reading it, will restore it to zero or to the then position of pusher pin 14.

The means for driving and return or reset of pusher pin 14 can be any of various forms already well known, for example as fully disclosed in Patent 2,160,415, Emmens. For the sake of ease in understanding the theory, a means has been illustrated which does not have any great resemblance to present forms and is not intended to be followed in production. One side-wheel 18 of a differential unit 19 is driven by disk 12.

The illustrated means for this drive comprises part of the present invention and is described below. During the measuring part of the interval, the planetary ring 22 is held stationary by a brake 23. Because the axis of planetary pinion 21 carried by ring 22 is thus a fixed axis, at this time, the turning of side-wheel 18 will also turn the other side-wheel 24 which turns gear 26 carrying pusher pin 14 on one face thereof. The resetting action is timed by a synchronously driven timing element 28. This element is driven by a synchronous motor 29 by means forming part of the invention and described below. The timing disk 28 is assumed to rotate once for each 15 minutes if the interval is the common 15-minute interval. At the end of each interval, a trip-pin 29 carried by disk 28 will strike lever 31 and swing it to the left thereby releasing brake 23 from ring 22. Gear 26 is biased in the zero direction, the biasing means being illustrated as spring 33 and strand 34 wrapped around a drum or pulley 36. When brake 23 is lifted from ring 22, the gear 26 is free to return under influence of spring 33 and it is swung back to the zero position, determined by the pusher pin 14 coming to rest against zero stop 16. Almost immediately the trip-pin 29 moves off of the end of lever 31 releasing the lever 31 to be urged by spring 38 to its braking position with the brake 23 resting on ring 22 and again holding it stationary so that further movement of side-wheel 18 will begin a new advance of pusher pin 14.

*Prior cause of excess readings*

A long recognized fault of demand meters, as so far described, has been a danger of yielding excessive maximum demand readings if synchronous motor 29 failed, and especially if it operated erratically. The disk 12 would continue to advance the pusher beyond (and perhaps far beyond) the point at which it would have been reset to zero if motor failure had not delayed or prevented the reset operation.

*Excess-prevention feature of this invention*

According to the illustrated form of the present invention, means are provided for preventing the drive of side-wheel 18 by disk 12 to advance pointer pin 14 unless motor 29 is also running. A key element in accomplishing this is the provision of a blocking element 41 shown in the form of a ratchet wheel, which is driven constantly as synchronous motor 29 is driven. Associated with this blocking element or ratchet 41 is a follower element or pawl 42 carried by a gear 43 which is in the gear train by which meter disk 12 drives side-wheel 18. The ratchet wheel 41, while motor 29 is operating, rotates at a faster speed than any speed of gear 43 within the range of expected measurement. Accordingly, ratchet wheel 41 will simply overrun the pawl 42 during normal operation. However, if for any reason, synchronous motor 29 should stop, ratchet wheel 41 would also stop, whereupon pawl 42 would catch on one of the teeth of ratchet wheel 41 (which would be more numerous than shown) whereupon it could move no further. Pawl 42 is, of course, biased toward ratchet wheel 41 as by a biasing spring 44.

It will thus be seen that if synchronous motor 29 stops, either permanently or intermittently, so that the reset will not occur at the time when it should here will be no danger that the maximum demand pointer will be pushed to a false high, because while the motor 29 is stopped the pusher pin 14 can not be advanced at all.

In order that the meter disk 12 may nevertheless continue to advance the kilowatt hour register 11, a friction drive unit 51 is provided in the drive between the take-off 52 for the kilowatt hour register and the gear 43. This has been represented by a friction washer 53 bearing against a hub 54 fast on shaft 56, gear 57 being pressed against friction washer 53 by a very light spring 58 so that slippage will occur at quite low torque thereby allowing the shaft 56 to be driven with practically no inaccuracy during this time. There should be some reduction gearing between the shaft of disk 12 and shaft 56. Coupler 59 is merely a device for permitting removal of the total register assembly which, in one or more parts, may include kilowatt hour register 11, synchronous motor 29, the associated gearing, and the maximum demand mechanism shown in the lower part of the figure.

Ratchet wheel 41 is fast on a shaft 61 driven by synchronous motor 29. Gear 43 is loose on shaft 61, this being made apparent to the eye by the unrealistic oversize axial hole in gear 43.

Instead of the ratchet and pawl, any other overrunning device may be used, such as an overrunning clutch, or a dancing pinion. Instead of blocking the drive, means for disengaging the drive to the transient demand element when the clock stops could be used. Instead of stopping the drive while motor 29 is not running, the amount of drive in that time could be indicated and subtracted, although this would be an inferior or only partial use of the inventive concept. This would, however, prevent an *undetected* false reading due to motor failure.

The invention can be used with other types of demand meters using a synchronous motor for supplying the time factor. If, instead of a reset device, there is another form of subtractive device, one which subtracts a fragment frequently or constantly, it is equally necessary that the transient demand indicator not be advanced by the meter disk unless the subtracting motor is running. In the claims such terms as "subtracting" are used to include reset devics too, since they subtract the entire.

I claim:

1. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, substration drive means driven by the synchronous motor, subtraction means driven by the subtraction drive means for actuation of the transient demand element toward zero with time as a factor, and blocking means interconnecting the advancing drive means with the subtracting drive means to prevent movement of the advancing drive means unless the subtracting drive means is operating.

2. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, subtraction drive means driven by the synchronous motor, subtraction means driven by the subtraction drive means for actuation of the transient demand element toward zero with time as a factor, and safety means responsive to movement of the advancing drive means while the subtracting drive means is stationary for preventing undetected drive of the advancing means for a period longer than said predetermined length.

3. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, substraction drive means driven by the synchronous motor, subtraction means driven by the substraction drive means for actuation of the transient demand element toward zero with time as a factor, and blocking means interconnecting the advancing drive means with the subtracting drive means to prevent movement of the advancing drive means unless the subtracting drive means is operating, said blocking means including overrunning means which enables the subtracting drive means to operate at a faster rate than the advancing drive means without affecting the advancing drive means.

4. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, subtraction drive means driven by the sychronous motor, subtraction means driven by the subtraction drive means for actuation of the transient demand element toward zero with time as a factor, and safety means responsive to movement of the advancing drive means while the subtracting drive means is stationary for preventing undetected drive of the advancing means for a period longer than said predetermined length, said safety means including overrunning means which enables the subtracting drive means to operate at a faster rate than the advancing drive means without affecting the advancing drive means.

5. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, subtraction drive means driven by the synchronous motor, subtraction means driven by the subtraction drive means for actuation of the transient demand element toward zero with time as a factor, and blocking means interconnecting the advancing drive means with the subtracting drive means to prevent movement of the advancing drive means unless the subtracting drive means is operating;
in combination with an energy register and means constantly connecting the energy register to be driven by the primary drive shaft independently of said friction drive means.

6. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, friction drive means and advancing drive means driven thereby for advancing the transient demand element in response to rotation of the primary drive shaft, a synchronous electric motor, substraction drive means driven by the synchronous motor, substraction means driven by the substraction drive means for actuation of the transient demand element toward zero with time as a factor, and safety means responsive to movement of the advancing drive means while the substracting drive means is stationary for preventing any advancing drive of the transitory demand means.

7. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, advancing drive means for advancing the transient demand element in response to rotation of the primary drive shaft, a sychronous electric motor, subtraction drive means driven by the synchronous motor, subtraction means driven by the subtraction drive means for actuation of the transient demand element toward zero with time as a factor, and safety means responsive to movement of the advancing drive means while the substracting drive means is stationary for preventing undetected drive of the advancing means for a period longer than said pre-determined length.

8. A maximum demand register including a primary drive shaft adapted to be meter-driven, a maximum demand indicator adapted to stay where it is moved, a transient demand element for advancing the maximum demand indicator to the position of greatest displacement of the transient demand element from zero position, advancing drive means for advancing the transient demand element in response to rotation of the primary drive shaft, a synchronous electric motor, subtraction drive means driven by the synchronous motor, subtraction means driven by the subtraction drive means for actuation of the transient demand element toward zero with time as a factor, and blocking means interconnecting the advancing drive means with the subtracting drive means to prevent movement of the advancing drive means unless the subtracting drive means is operating.

9. A fail-safe apparatus for use in conjunction with a device including a time shaft, driven by time-drive means at a speed related to time, and advancing means including a second shaft for a function to be performed in relation to time, including:
  an overrunning device having leading and trailing elements and means to prevent the trailing element from running faster forwardly than the leading element while allowing the leading element to overrun the trailing element,
  said trailing element being coupled to the second shaft to be driven by it and said leading element being coupled to the time shaft to be driven by it normally at a speed as great as the expected maximum speed of the trailing element,
  said time drive means, being of a construction which, in the event of its failure, prevents rotation of the time shaft, whereby the leading element, the trailing element and second shaft will be stopped.

References Cited

FOREIGN PATENTS 175,126   9/1906   Germany.

RUDOLPH V. ROLINEC, *Primary Examiner.*

E. F. KARLSEN, *Assistant Examiner.*